United States Patent
Roch

[15] 3,691,887
[45] Sept. 19, 1972

[54] AUTOMATIC SHEARING METHOD AND APPARATUS

[72] Inventor: Gerald V. Roch, New Augusta, Ind.

[73] Assignee: Hurco Manufacturing Company, Inc., Indianapolis, Ind.

[22] Filed: June 1, 1970

[21] Appl. No.: 42,047

[52] U.S. Cl. ..........................83/277, 83/71, 83/219, 83/248, 83/282, 83/380, 83/389, 83/412, 83/460, 84/599, 83/605, 83/639, 83/648, 83/694

[51] Int. Cl. ..............................B26d 5/12, B26d 5/30

[58] Field of Search....83/36, 43, 277, 206, 409, 622, 83/620, 618, 639, 694, 248, 282, 605, 599, 380, 389, 412, 409, 460

[56] References Cited

UNITED STATES PATENTS

| | | |
|---|---|---|
| 3,349,658 | 10/1967 | Johns et al...............83/277 X |
| 1,519,983 | 12/1924 | Robbins........................83/622 |
| 3,230,812 | 1/1966 | Pucci et al. ..............83/639 X |
| 354,170 | 12/1886 | Myers.........................83/36 X |
| 1,863,005 | 6/1932 | Campbell ....................83/409 |
| 3,129,622 | 4/1964 | Pearce......................83/277 X |
| 3,231,099 | 1/1966 | Kidd.........................83/277 X |
| 3,308,702 | 3/1967 | Klein .......................83/622 X |

Primary Examiner—Frank T. Yost
Attorney—Woodard, Weikart, Emhardt & Naughton

[57] ABSTRACT

Two pairs of shears disposed at right angles and operable simultaneously, shear a sheet along intersecting lines simultaneously, the sheet being held and located by a power-driven positioning carriage. Each blank is cut to finished size, and various operational modes are available.

38 Claims, 16 Drawing Figures

INVENTOR
GERALD V. ROCH
BY
Woodard, Weikart, Emhardt & Naughton
ATTORNEYS

INVENTOR
GERALD V. ROCH
BY
Woodard, Weikart, Emhardt & Naughton
ATTORNEYS

INVENTOR
GERALD V. ROCH
BY
Woodard, Weikart, Emhardt & Naughton
ATTORNEYS

AUTOMATIC SHEARING METHOD AND APPARATUS

BACKGROUND OF THE INVENTION

1. Field of the Invention

This invention relates generally to machine tools, and more particularly to a shearing machine wherein cuts are made simultaneously on intersecting lines to produce a finished blank from a sheet positioned and held by power driven carriage means.

2. Description of the Prior Art

Conventional metal shearing practice involves a pair of power-driven shears capable of cutting a sheet along a single line at a time. As the sheet is manually or machine fed through the plane of the shears, blanks are cut from the sheet and fall behind the blades.

It is quite common for the shear operator, or his assistant, to collect blanks from behind the shear blades and carry them around to the front to be passed through the blades individually for shearing into smaller blanks of the desired size. This procedure involves considerable time and handling, and sometimes involves considerable effort, before the collection of blanks cut to the desired sizes is completed.

The present invention is directed toward reduction of time, effort and expense of producing sheared blanks of specified sizes from sheet or plate material.

In addition to conventional well known and widely used shears, there are some patents pertaining to various types of notching presses, coupon cutters, and sheet or web cutting equipment. For example, U.S. Pat. Nos. 3,405,583 and 3,446,105 issued to J. H. Herzog, describe notching equipment for use on presses. The Detjen Pat. No. 1,416,800 describes a device for cutting coupons or tabs from a sheet. The Duenke Pat. No. 2,897,892 describes adjustable die structure for cutting materials such as those used for transformer core laminations. The Biel Pat. No. 2,850,090 describes a method for trimming, cutting and cornering folded paper articles. The Bielert Pat. No. 3,405,880 discloses a method and apparatus for punching blanks from relatively wide and long webs of sheet stock, the web normally being stored on reels.

Although the aforementioned patents deal with various methods and forms of apparatus for punching or cutting paper or metal materials, none of them is intended for shearing blanks of assorted sizes from metal sheet or plate material. Accordingly, the prior art notwithstanding, there remains a need for equipment capable of economically and accurately shearing metal sheet or plate material into finished blanks of desired sizes.

SUMMARY OF THE INVENTION

Described briefly, in a typical embodiment of the present invention, the shearing machine has two pairs of shears intersecting at right angles to enable the making of a right-angle cut in sheet or plate stock with a single stroke of the shearing machine. A positioning carriage incorporating sheet grippers energized by a pneumatic tube, is driven by pneumatic cylinders in both the X-axis and Y-axis directions with respect to the shears. Hydraulic means are provided for control of the positioning, as well as appropriate programming means for operating mode selection and predetermination of finished part dimensions. Conveyor means are provided behind the blades for bearing off-fall to appropriate collection stations for the scrap and finished blanks.

DESCRIPTION OF THE PREFERRED EMBODIMENT

Figure 1:
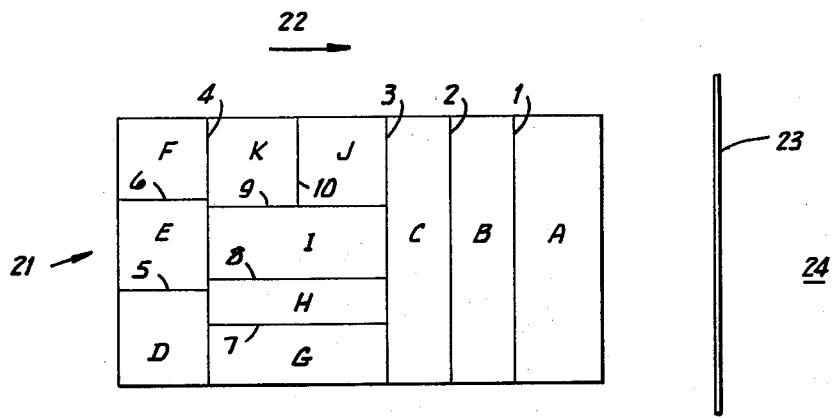
FIG. 1 is a schematic illustration of prior art sheet shearing procedure.

Referring now to the FIG. 1 representation of prior art, a metal sheet 21 is shown in position for advancement in the direction of the arrow 22 toward a pair of shears 23. Assuming for simplicity, that the sheet is a rectangle, and requires no trimming to "square it up", the various areas thereon designated by the letters of the alphabet represent the finished blanks which are desired. These are to be produced by shearing the sheet.

The normal procedure in order to obtain the blanks designated is to move the sheet in the direction of arrow 22, stopping and shearing at each of the lines designated by numerals 1, 2, 3 and 4. This produces three finished blanks "A", "B", "C", and two additional blanks, all behind the shears in the area 24. The two unfinished blanks must then be carried around to the front of the shears. One of these is passed through the shears in the direction of arrow 22 for shearing along the lines 5 and 6. This produces the finished blanks, "D" and "E" behind the blades, and the finished blank "F" in front of the blades. Then the other blank is passed through the shears in the same direction for shearing along the lines 7, 8 and 9, producing the finished blanks "G", "H", and "I" behind the shears, and an unfinished blank in front of the shears. This unfinished blank is then shorn along the line 10 to produce the finished blank "J" behind the shears, and the finished blank "K" in front of the shears.

Figure 2:
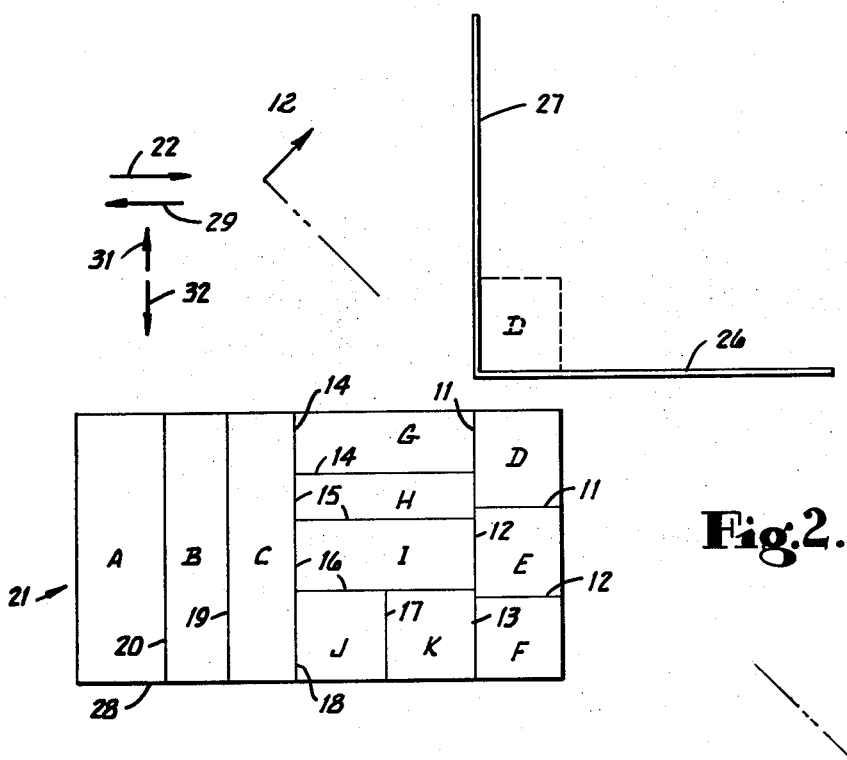
FIG. 2 is a diagram of the same type as FIG. 1, but illustrating the shearing according to one embodiment of the present invention.

The foregoing description of the prior art practice illustrates that even for a comparatively simple arrangement of blanks on a sheet, blanks of finished and unfinished dimensions will be deposited behind the shears, so some bearing of off-fall is necessary to pass blanks of unfinished size through the shears in order to obtain the blanks of the desired size. The present invention overcomes this problem as illustrated in FIG. 2 wherein a pair of shears is provided at 26 and another pair at 27, these being arranged for simultaneous operation to shear on intersecting lines. For purposes of illustration, the sheet is given the same reference numeral 21. However it is inverted so that the order of cuts is somewhat different. However, it will be appreciated that this particular order of cuts described with reference to FIG. 2, is not essential, as they can be made in various other orders.

With the carriage means gripping the sheet adjacent the lower marginal edge 28, the X and Y axes drives thereof are able to move the sheet in an X axis direction 22 or 29, and in a Y axis direction 31 or 32. With the sheet oriented as shown in FIG. 2, the sheet will be moved as needed to place the sheet portion D within the corner of the two pairs of shears 26 and 27 for shearing the sheet along the lines 11, to thereby remove the blank D from the sheet. Then the sheet may be moved in the direction of arrow 31, and stopped for shearing along the lines 12 to remove blank E. Then it is moved again in the direction of arrow 31 for shearing along the line 13 to remove blank F.

Then the sheet is moved in the direction of arrow 32 and arrow 22 for shearing blank G away from the sheet along lines 14. Then it is moved in the direction of arrow 32 for shearing blank H from the sheet along the lines 15. Then it is moved again for shearing blank I from the sheet along lines 16. Then it is moved in the direction of arrow 29 and arrow 31 for removing blank K by shearing along line 17. Then it is moved in the direction of arrow 22 for removing blank J by shearing along line 18. Then it is moved in the direction of arrow 22 for removal of blank C by shearing along line 19, and then it is moved once again in the direction of arrow 22 for removal of blank B by shearing along line 20.

It should be apparent from the foregoing description, that each blank sheared from the sheet is deposited behind the blades, and the only blank which, in its finished form, remains in front, is the last one. Moreover, all blanks which fall behind the shears are of finished size.

It will be recognized from the foregoing description, that as a practical matter it will likely be necessary to allow a gripping margin of about three-fourths inch along the lower edge of the sheet, or to shift the grippers along the sheet as certain portions are removed from the right-hand end thereof, such as the blanks F, K, J, C and B. Means for accomplishing this will be described hereinafter.

Figure 3:
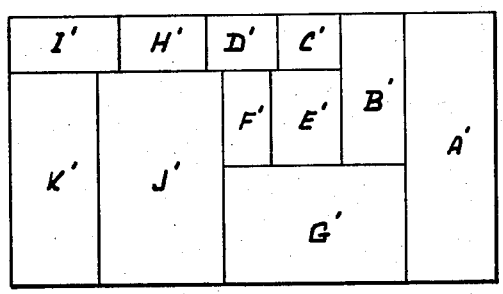
FIG. 3 is a view of a sheet with areas designated thereon in such manner to be virtually impossible to remove by shearing on typical conventional shearing machines.

Referring now to FIG. 3, wherein each of the blanks on sheet 33 is given a prime sign, brief consideration will make it apparent that only blank A can be removed by the prior art practice described above. There is no easy way to remove the rest of the blanks from the sheet with conventional power driven shears. Nevertheless, the particular arrangement illustrated may be the most satisfactory arrangement consistent with optimum usage of the area of material available for the collection of blanks needed. Further consideration in view of the present invention will make it apparent that the blanking from a sheet arranged as shown in FIG. 3 can be accomplished readily.

Figure 4:
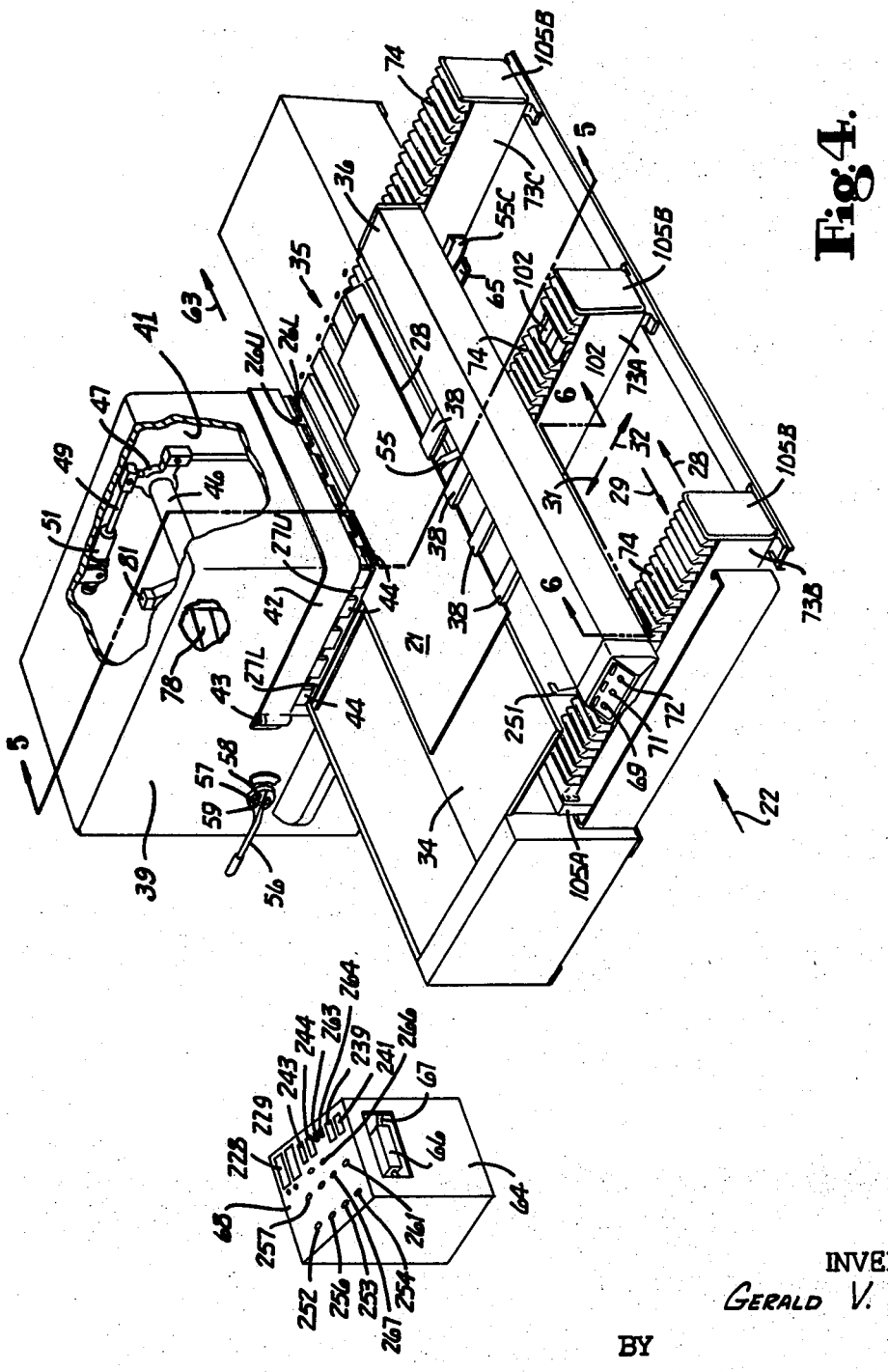
FIG. 4 is a perspective view of a shearing machine according to a typical embodiment of the present invention.

Referring now to FIG. 4, illustrating a typical embodiment of the present invention, the machine includes a positioning support table including a slide top portion 34 and slatted top portion 35, the latter being partially rolled down under a positioning support carriage, this carriage having an external housing 36 disposed below the level of the top surfaces of the table. The carriage has a plurality of sheet grippers 38 spaced along the marginal edge 28 of the sheet 21 supported on the table top.

Left and right gap frame members 39 and 41 with cross members 40 and 84 affixed between them, (FIG. 5) are provided to support a ram on which the upper blades 26U and 27U of the shears 26 and 27 are mounted at right angles. A holddown assembly 42 is mounted to the left-hand frame member 39 by a hinge assembly 43, and has a plurality of holddown feet 44 spaced therealong immediately in front of upper shear 26U and immediately to the left of upper shear 27U.

Figure 5:
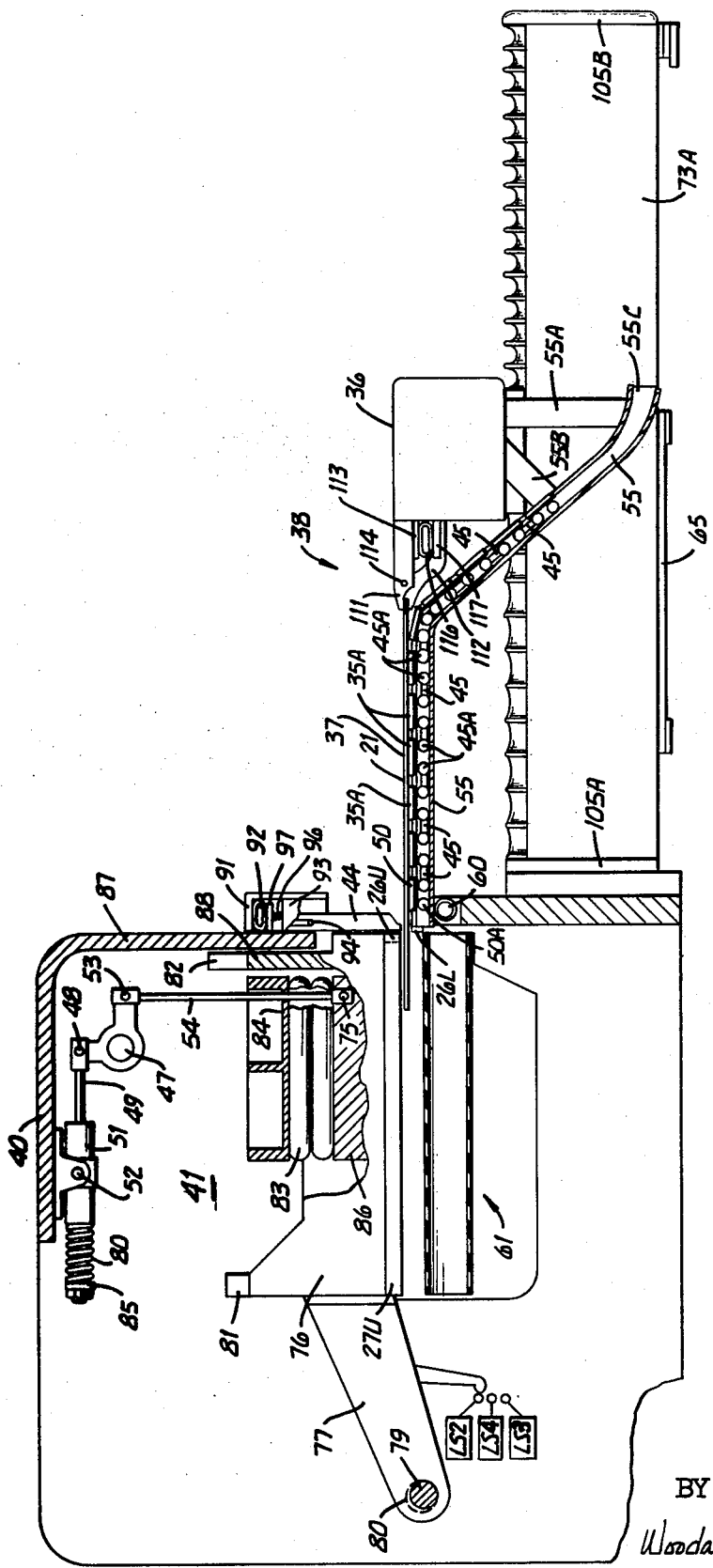
FIG. 5 is an enlarged view of the machine taken generally at line 5—5 in FIG. 4.

There is a torsion bar 46 mounted in bearings in the frame members 39 and 41. Near each end of the torsion bar 46, an equalizer torque arm 47 is affixed to the bar, (only one of these being visible in FIG. 4) and it has a pivotal connection at 48 to the piston rod 49 of a power stroke control hydraulic cylinder 51, trunnion mounted to the ram housing top cross member 40 to permit limited pivoting on the trunnions at 52. The equalizer arm also has a pivotal connection at 53 to a bar 54 extending down to a pivotal connection at 75 with ram cross member 86 (FIG. 5).

As shown on the left hand side of the gap frame member 39, in FIG. 4, a handle 56 is provided on a plate 57 pivotally mounted in the member 39 and having a ram pivot shaft (79 in FIG. 5) eccentrically mounted thereon. The plate has the slots 58 therein and cap screws 59 passing through each slot, whereby the position of the plate can be affixed to determine the eccentric position desired for the ram pivot shaft.

Endless belt conveyor 61 extends out to the right from behind the blades 26 and 27, to convey completed blanks in the direction of arrow 63.

A control console 64 is provided at any desired convenient location adjacent to the machine, and may include a tape reader 66 therein, with program tape passing therethrough at 67. The operator's control panel 68 contains a plurality of switches and indicators which will be described hereinafter. The positioning carriage housing 36 may also have indicators thereon, but more likely it will merely have a cycle start button 69, a gripper clamping button 71, and a gripper unclamping button 72.

To provide Y axis motions of the carriage in the direction of arrows 31 and 32, Y axis drive means are provided in housings 73A, 73B, and 73C. The housing 36 is supported on three pedestals, one extending up from each of the drive means in housings 73 through accordian type bearing way covers 74 atop the housings. The X axis motions in the directions of the arrows 29 and 22 are effected by drive means within the housing 36 as will become apparent as the description proceeds.

Referring now to FIG. 5, the left-hand gap frame member 39 is omitted as are the Y axis drive units in housings 73A and 73B, and the left-hand wall of a left-hand table slot track, in order to show interior details of the ram, holddown assembly, and to show the conveyor location and the slat end assembly. The ram 76 has a pair of support arms, the left-hand arm 77 and right hand arm 78 (FIG. 4) being mounted on the pivot shaft 79, the left-hand end of which is affixed to the plate 57 (FIG. 4) previously described, whereby the shaft can be moved from the position shown in the solid outline in FIG. 5 to the position shown in the dotted outline 80 in FIG. 5 by appropriate adjustment of the arm 56 in FIG. 4. The right-hand end of shaft 79 may be supported in like manner. Gibs are provided at the left and right-hand sides of the ram, near the front, and about half-way between the front and the pivot axis. The right-hand gibs are shown at 81 and 82 in FIGS. 4 and 5. A pneumatic bag 83 may be provided between an upper support frame 84 therefor and the ram cross member 86. Ram return springs are provided such as at 80, encircling the piston rod projecting from the rear of cylinder 51, and retained between the cylinder end and the seat plate 85 bolted in the rear end of the piston rod.

A front cross member 87 is provided across the front of the gap frame members 39 and 41 and affixed thereto. The front cross member 88 of the ram is disposed immediately behind it. The front portion of the holddown assembly is immediately in front of it and includes a top plate 91, a pneumatic actuator tube 92, each holddown foot 44, holddown foot guides 93 and guide pins 94, and return springs 96 between the side guide plates 93 and the lower face of the holddown foot headplate 97. These holddown feet are disposed immediately above the lower front shear blade, shown at 26L, the lower side shear blade being omitted from FIG. 5 in order to permit showing the conveyor 61.

In order that the handling of stock while loading it onto the machine be unimpeded by superstructure, the housing 36 is, for the most part, below the level of the cutting edge of the lower shear blades 26L and 27L. To permit the housing, thus depressed, to move inward in the direction of arrow 31, the slats 35A are linked together by links as at 45, and the first slat 50 is pinned to the machine frame at 50A. The same pins that serve to connect links to the slats, have rollers on the ends thereof as at 45A. These rollers, at the left-hand ends of the slats are received and supported in track 55 which is affixed to the carriage housing 36 as by brackets 55A and 55B (FIG. 5). The underside of the front end portion of the track can be supported by roller 60 mounted to the machine frame and supporting the track adjacent the plane of the shears 26 as the track moves in and out in the direction of arrows 31 and 32 respectively with the carriage housing.

Figure 11:
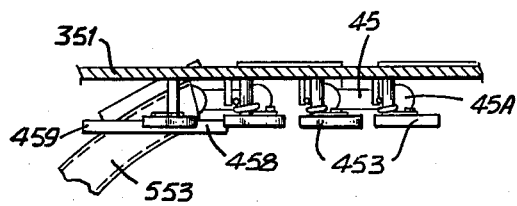
FIG. 11 is a section taken at line 11—11 in FIG. 10 and viewed in the direction of the arrows.

The track support rollers 45A at the right-hand (FIGS. 11 & 12) ends of the slats are normally supported on a series of plates mounted on vertical pivot shafts 452 which may be fixed in the table top 351 with their upper ends flush with the upper face thereof and projecting downwardly from the underside thereof. These plates are normally urged in the counter-clockwise direction by springs 452 and rest against stops in the normal supporting position as at 453. However, these plates are pivotal in the clockwise direction by cam 454 to a position such as at 456 and 457.

Cam 454 has a leading edge 458 on a portion extending from the lower surface of a track 553 mounted to plate 101 in the same manner as track 55 as shown in FIG. 5. However, track 553 differs from track 55 in that it terminates at a point 554 about in line with the forward edges of the gripping fingers, to avoid entering the plane of the shears 26 as the carriage moves toward the shears 26.

With the left and right-hand rollers thus supported, as the carriage housing 36 is driven toward the shears 26, the track 55 moves in unison with the carriage. As the downwardly curved portion of the track encounters successive slat support rollers, it permits the rollers (and thereby the slats) to descend. At the right-hand end of the slats, as the front end 554 of the track 553 approaches the support rollers, the cam face 458 pushes the support plates 453 out of the way as at 456 and the top of the cam leads the track 553 into rolling supporting engagement with the roller. As the cam passes each support plate, the return spring will return it to initial position. The rear face 459 of the cam will ease the plates back out of the way as the carriage retracts.

As the tracks move in toward the shears, and the slat support rollers are deposited out the ends 55C of the tracks, the slats may rest on rails 65 secured to and projecting parallel to the housings 73. As the tracks move out with the carriage housing, they lift the slats and restore them to their original table top forming level.

Figure 6:
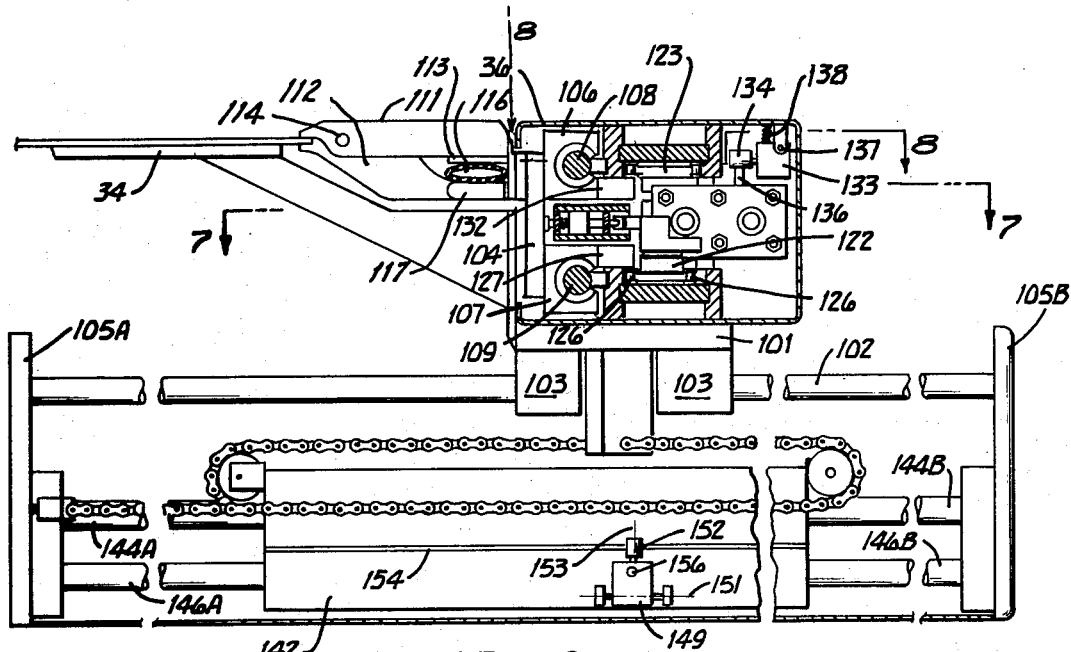
FIG. 6 is a further enlarged section taken at line 6—6 in FIG. 4 and viewed in the direction of the arrows, showing some details of the grippers, carriage, and "X axis" and "Y axis" drive means therefor, portions being broken out as indicated to conserve space in the drawing.

Referring now to FIG. 6, the positioning carriage includes the upper housing 36 affixed to plates 101 of the three Y axis drive units. Each plate 101 is mounted for movement in the Y axis sense in the direction of arrows 31 and 32 on a pair of horizontally spaced rods 102. Ball bushings or other appropriate bearing means in blocks 103 may be provided for low friction traversal. The ends of bars 102 are received in and affixed to end plates such as shown at 105A and 105B in FIGS. 4 and 5.

The carriage housing 36 encloses the gripper carriage 104 including upper and lower bearing mounts 106 and 107, each having suitable bearings to run on the upper and lower guide rails 108 and 109 respectively of the carriage housing. Ball bushings may be employed in this instance also, for low-friction movement of the gripper carriage 104 in the X axis sense of arrows 22 and 29 of FIG. 4.

The sheet grippers 38 include the upper fingers 111 affixed to the carriage, and the lower fingers 112 pivotably mounted to the upper fingers at pine 114. An elongated pneumatic actuator tube 116 is mounted on the lower finger plates 117 and is disposed under the upper finger plates 113. Inflation thereof serves to close the fingers on the edge of the sheet 21 to be sheared.

Figure 7:
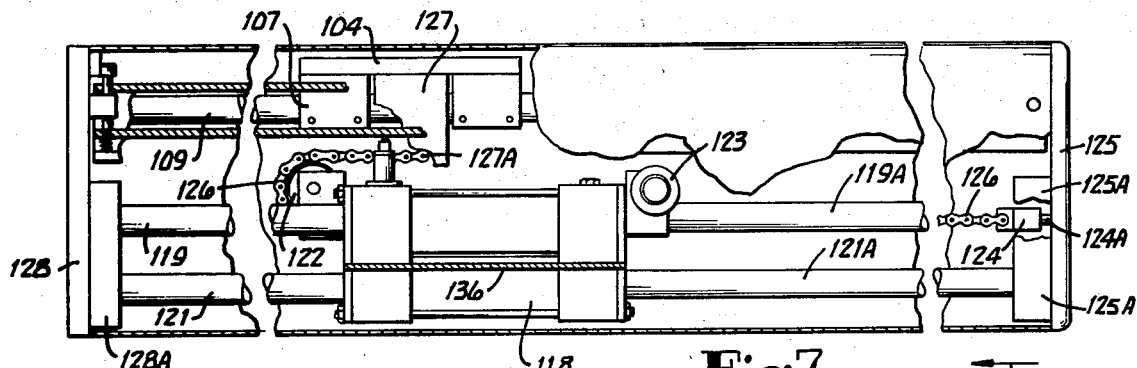
FIG. 7 is a section taken at line 7—7 in FIG. 6 showing the "X axis" carriage drive cylinder block, motion multiplier.

To drive the carriage 104 in the X direction, a cylinder block 118 is employed, (FIGS. 6 and 7), this block having a pair of cylinders therein, side-by-side, with piston rods 119 and 119A extending out from the left and right ends, respectively, of the one cylinder, and the piston rods 121 and 121A extending out from the left and right ends, respectively, of the other cylinder. This cylinder block has one pulley 122 on the bottom wall thereof, and another pulley 123 on the top wall thereof, each being mounted for rotation on an axis perpendicular to the plane of the piston rods and each having a chain passing therearound. In the case of the chain 126 on the pulley 122, one end thereof is affixed to a block 124 connected by adjusting screw 124A to end plate 125 of the carriage housing (FIG. 7). The other end of the chain 126 is connected to an inwardly projecting arm 127 of the carriage 104 at 127A. Piston rods 119A and 121A are received in and affixed with respect to manifold block 125A affixed to the wall 125, while rods 119 and 121 are received in and affixed with respect to manifold block 128A affixed to the end plate 128.

Figure 8:
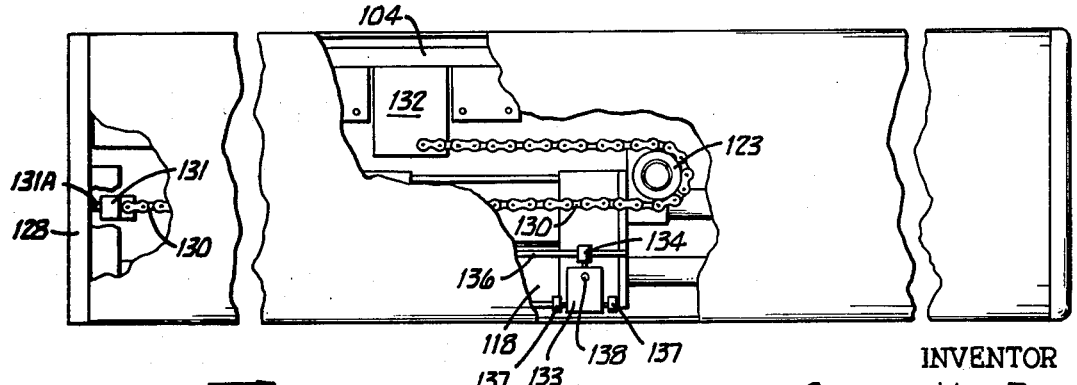
FIG. 8 is a section similar to FIG. 7 but taken at line 8—8 in FIG. 6.

As shown in FIG. 8, the pulley 123 has the chain 120 thereon, with one end thereof connected to the block 131 fastened by adjusting screw 131A to end plate 128. The other end of chain 130 is connected to the arm 132 of the carriage 104. By providing this chain and pulley arrangement, travel multiplication is obtained so that, because of pulley 122 and chain 126, a given increment of travel of the cylinder block 118 in the direction of arrow 29, will result in travel of the carriage 104 in the same direction twice the distance. Similarly, in FIG. 8, travel of the cylinder block 118 a given increment in the direction of arrow 22, will result in travel of the carriage a distance twice as great.

Because of the travel multiplication feature employed with the cylinder block 118, it is not necessary that the piston rods extend the entire length from one end 124 to the other end 128 of the housing, if it is found desirable to use some other structural members at a lesser spacing. At this point it might also be mentioned that the piston rods 119 and 119A are colinear and extend in opposite directions from a single piston in one cylinder in the housing, this cylinder containing hydraulic fluid or oil. Similarly, piston rods 121 and 121A extend in opposite directions from a piston in the other cylinder in the block, this cylinder being divided into two chambers by the piston, these chambers being pressurized with air. Further details and the operation of such structure is described hereinafter.

It will become apparent as the description proceeds, that for automatic operation it is essential to know the extent of linear travel of the carriage, both in the X axis and in the Y axis directions. The X axis travel may be detected by a rotary encoder 133 mounted over the cylinder block 118. This encoder has a cylindrical encoder wheel 134 projecting therefrom and having its circumference engaging the longitudinally extending bar 136 projecting up from and affixed to the cylinder block 118. The encoder is pivoted at 137 and a compression spring 138 between the encoder and the carriage housing continuously urges the encoder wheel against the track 136 so that, as linear motion takes place in the X axis direction, the extend of travel will be precisely transmitted into the encoder by the rolling of the wheel 134 on the track 136. While pinion teeth on the wheel, and rack teeth on the bar 136 could be employed, or pins and holes or some similar positive displacement arrangement, such details have been found unnecessary for proper precise and accurate operation of rotary encoders.

Referring now to FIGS. 4 and 6, the Y axis drive apparatus for the positioning carriage is shown. End plates 105A and 105B serve to support the opposite ends of the bearing rods 102. Each of the rods 102, supports the bearing housings 103, each of which is affixed to the bar 101 which extends the length of the housing 36 to which the housing is affixed. The Y axis drive is provided by essentially the same type of apparatus as described above for the X axis drive. In includes the cylinder block 142 coupled to the housing through travel multiplying chain and sprocket means of the type described above, and which need not be described in detail at this point. Such an arrangement is provided for each of the units 73 of FIG. 4. The cylinder block 142 is mounted on piston rods 144A, 144B, 146A and 146B, each of the rods 144A and 146A having one end affixed to the member 105A, and each of the rods 144B and 146B having one end affixed to the cross member 105B. The other end of each of the rods is connected to a piston as will be described hereinafter, one piston for the rods 144A and 144B and anotherpiston for the rods 146A and 146B, these pistons being disposed in a pair of cylinders in the block 142.

In a manner much like that described above with reference to FIGS. 6 and 8, cylinder block 142 has a rotary encoder 149 pivotally mounted thereto on a hinge axis 151 and having an encoder wheel 152 extending therefrom and rotatable on the axis 153. The circumferential surface of this encoder wheel rides on the top surface 154 of a rail extending from one end of the cylinder block to the opposite end thereof, and a spring may be employed at 156 to urge the wheel continuously into engagement with the surface 154 so that the linear travel of the cylinder block 142 is reliably detected. Each encoder may be arranged to complete one revolution during one inch of travel of the carriage, and produce 1,000 pulses per revolution. It should produce two output signals in quadrature so that direction may be determined. Other outputs may also be provided.

Figure 9:
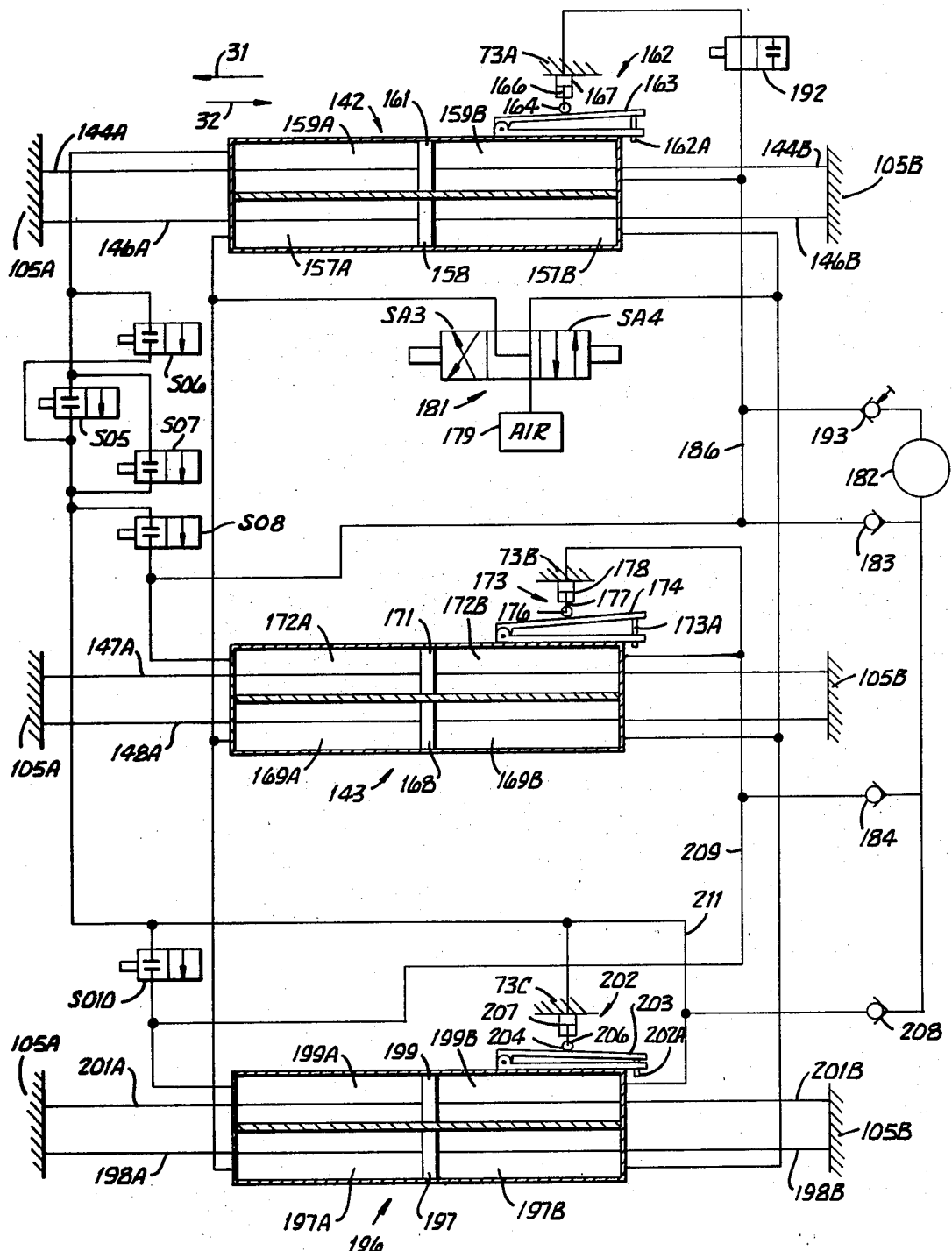
FIG. 9 is a combination pneumatic-hydraulic schematic diagram of the Y-axis drive apparatus and compensating system for the positioning carriage.
Figure 10:
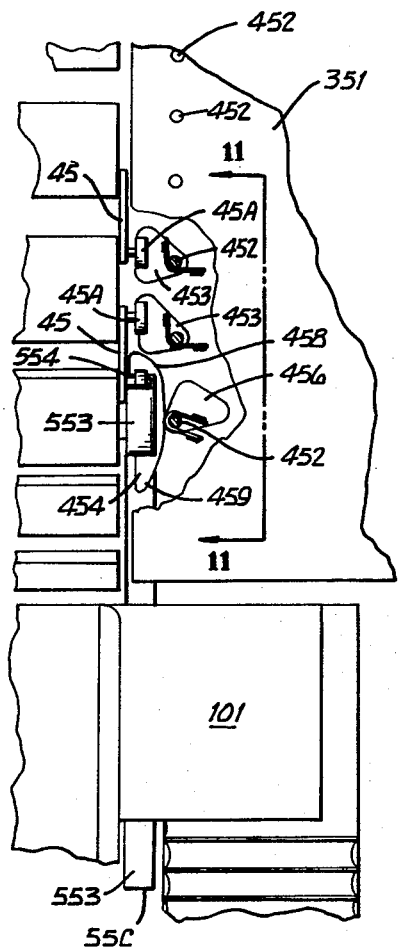
FIG. 10 is a top plan view of a portion of the right-hand ends of the table top slats, with a portion of the top extension broken away to show details of the slat support track and plates and the operating cam therefor.

Referring now to the schematic pneumatic and hydraulic diagram of the Y axis drive cylinders in FIG. 9, cylinder block 142 has a pair of cylinders, the first cylinder being divided into two chambers 157A and 157B by a piston 158. This piston is connected to the piston rods 146A and 146B affixed to end plates 105A and 105B, respectively. The second cylinder in the cylinder block 142 is divided into the chambers 159A and 159B by the piston 161. This piston is mounted to the rods 144A and 144B affixed to the end plates 105A and 105B, respectively. A cam assembly 162 is mounted to the cylinder block 142 and has a ramp surface 163 engaged by follower roller 164 on a piston rod 166 in a compensating cylinder 167 which is affixed to a portion of the Y axis drive housing 73A. Of course, the housing 73A is affixed with respect to the end plates 105A and 105B. A cam ramp inclination adjusting screw 162A is provided for a purpose to be described hereinafter.

Cylinder block 143 of the Y axis drive unit 73B, has a cylinder therein with piston 168 dividing the cylinder into chambers 169A and 169B. Piston rods 148A and 148B are affixed to the respective end plates for this drive unit, just as the corresponding piston rods were connected to the end plates for the drive unit 73A. Similarly, the other cylinder in cylinder block 143 is divided by the piston 171 into the chambers 172A and 172B. Piston rods 147A and 147B, connected to the piston 171, are affixed respectively to the opposite end plates of the unit. Cylinder block 143 is provided with a cam assembly 173 thereon, having a ramp surface 174 of inclination determined by the setting of adjustment screw 173A. Follower roller 176 engages the ramp surface and is connected to the follower piston shaft 177 connected to a piston in the compensating cylinder 178 affixed to the housing 73B.

Cylinder block 196 has a pair of cylinders therein, the first being divided into chambers 197A and 197B by the piston 197. Piston rods 198A and 198B are connected to the piston and are affixed to end plates at the opposite ends of the drive unit. The second cylinder is divided into chambers 199A and 199B by the piston 199. Piston rods 201A and 201B are connected to the piston and their opposite ends are affixed to the opposite end plates of the drive unit. A cam assembly 202 includes the ramp 203 and adjusting screw 202A. A follower roller 204 engages the ramp surface and is connected to a shaft 206 which is in turn connected to a piston in the compensating cylinder 207 affixed to the drive unit housing 73C.

A source of air is indicated at 179 and may be a shop supply at 90 pounds per square inch (p.s.i.) for example. A three position solenoid-operated valve 181 is connected between the air source 179 and the chambers of the first cylinder of each of the three cylinder blocks. Accordingly, line pressure is normally applied through valve 181 to the chambers 157A, 157B, 169A, 169B, 197A, and 197B.

An accumulator is provided at 182 and, by means of the one-way check valves 183, 184, and 208, is able to maintain a full condition of hydraulic fluid (typically oil) in hydraulic lines 186, 209, and 211. Line 186 normally communicates with hydraulic chambers 159B and 172A. Line 209 normally communicates with chamber 172B and 199A. Line 211 normally communicates with chamber 199B and is communicable with chamber 159A. Oil control solenoid valves SO5, SO6 and SO7 are provided in line 211 for motion control and lock-up, and will be described. Solenoid operated oil valves SO8 and SO10 are provided for balancing, as will become apparent. A manually operated normally open valve 192 is provided between the compensating cylinder 167 and the line 186. The pressure relief valve is provided at 193 between the line 186 and the accumulator, enabling return of hydraulic fluid to the accumulator in the event of rise of pressure in line 186 over the setting of the relief valve.

In operation, in order to drive the X carriage 36 in the Y axis direction of arrow 31 toward the shear, it is necessary to vent air chambers 157B, 169B, and 197B. It is also necessary to permit departure of oil from the hydraulic cylinder chambers 159B, 172B and 199B, and admit oil to cylinder chambers 159A, 172A, and 199A. Then the cylinder blocks can move in the direction of arrow 31. For uniformity of operation it is necessary that all three cylinder blocks move in like manner. In order to achieve the venting of the air chambers, while applying pressure to the others, solenoid valve assembly 181 is shifted in the direction of arrow 32, activating the SA3 portion thereof in the circuit. In order to permit departure of oil from hydraulic chamber 199B and admission of oil to hydraulic chamber 159A, solenoid valves SO5, SO6, and SO7 may be shifted to provide communication between these chambers. In the illustrated embodiment, chamber 159B is constantly in communication with chamber 172A, permitting the shuttling of oil between there two chambers as needed. Similarly, hydraulic chamber 172B is constantly in communication with hydraulic cylinder chamber 199A through the line 209, permitting the shuttling of oil back and forth between these chambers as needed. It is possible, however, to incorporate solenoid valves between the respective chambers in the lines 186 and 209, matching valves SO5, SO6 and SO7 in line 211 if this desired for equalization of pressure rise, flow restriction, and temperature effects in the three lines, or for any other desired reason. Accordingly, with the appropriate air chambers supplied by line pressure, and the appropriate communication between the hydraulic chambers of the respective hydraulic cylinders, the three cylinder blocks move simultaneously in the direction of arrow 31, driving the X carriage 36 in the same direction at twice the speed and distance due to the travel multiplying chain and pulley structure incorporated in the Y axis drive units.

As the carriage travel approaches the desired termination points, valve SO5 can be closed, permitting hydraulic communication between chambers 199B and 159A only through valves SO6 and SO7, thus slowing the speed of travel materially. At a further point in travel, valve SO6 is closed, whereupon the speed is further reduced to a creep rate. At a further point, valve SO7 is closed and cylinder travel is terminated due to the hydraulic lock-up thus achieved. This sequence of speed, fast, slow and creep, is used whenever distances to be moved are significant. For lesser distances, it may be that valve SO5 would not be activated, whereupon only the slow and creep speeds would be used. If desired the capacity of the valves would differ, or orifices could be used in lines associated with them, as needed, to obtain the flow rates needed for the speeds desired with the various valves activated.

In order to drive the X carriage outward in the direction of arrow 32, the three cylinder blocks must be driven in the same direction. For this purpose, the solenoid valve 181 is shifted from its spring-centered position, in the direction of arrow 31, to activate the SA4 portion and thereupon exhaust the air cylinder chambers 157A, 169A, and 197A. Then upon opening the solenoid valves SO5, SO6, and SO7, oil can leave chamber 159A and enter chamber 199B. Oil can shuttle from chamber 172A through line 186 to chamber 159B. Similarly, oil can shuttle from chamber 199A through line 209 to chamber 172B. At a point near the desired travel termination point, valve SO5 will be closed to reduce the speed. At a further point valve SO6 will be closed to reduce the speed to a creep, subsequent to which valve SO7 will be closed to terminate travel. Thereupon solenoid valve 181 will be allowed to return to center to balance the pressure on both sides of the air pistons.

Accumulator 182 can be pressurized to the extent needed to adequately pressurize the hydraulic circuits and compress the air trapped therein, thus causing the system to be stiffer when everything is at rest, than might otherwise be possible. If any oil leakage occurs, the accumulator can provide make-up oil continuously.

The accumulator 182 is also useful for balancing. This can be accomplished by applying the air pressure to one side of the piston in all three air cylinders, to drive the cylinders against the stops therefor. Then the solenoid valves SO8 and SO10 are opened momentarily, while one or all of the valves SO5, SO6, and SO7 are open. This enables the necessary communication throughout the hydraulic lines to enable all cylinders to fully engage their stops, such as end plates or other suitable stop means. At this time, oil can move from the accumulator as needed to provide a completely filled condition in all lines and cylinders. Then the valves SO5, SO6, SO7, SO8, and SO10 are closed, and normal operation can be resumed. Such balancing can occur within seconds.

For precise synchronizm of time and distance of movement of the three cylinder blocks to obtain the precise linear positioning desired, the three oil cylinders must normally have exactly the same bore size and shape. As a practical matter, this cannot be accomplished through conventional manufacturing techniques, so I have provided a self-compensating feature. Assuming the diameter of the oil cylinders in blocks 142 and 143 is smaller than the diameter of the oil cylinder in block 196, if the cylinders are driven in the direction of arrow 31, there will not be sufficient oil displaced from hydraulic cylinder chamber 172B to fill the chamber 199A at a rate sufficient to establish equal distances of travel of the two cylinder blocks. To compensate, the inclined plane 174 of the cam assembly 173 is adjusted by the screw 173A to incline upwardly to the right. Therefore, as the cylinder block 143 moves to the left, the follower roller 176 drives the piston upwardly and displaces oil from the compensating cylinder 178 into the line 209 at a rate compensating for the difference between volumes displaced in chambers 172B and 199A during an equal amount of travel of the two cylinder blocks 143 and 196.

At the same time as compensating cylinder 178 is furnishing make-up oil to chamber 199A, a greater amount of oil is being expelled from chamber 199B than can be accepted in chamber 159A of the first cylinder block 142 during a given distance of travel. Therefore, the adjusting screw 202A of the cam assembly 202 is set to establish an incline downward and to the right in the ramp 203 thereof. As the cylinder block 196 moves to the left, the follower roller 204 decends the ramp, withdrawing the piston in the compensation cylinder 207 to admit that amount of oil from chamber 199B which exceeds that which can be accepted in chamber 159A.

A compensating cylinder and cam assembly 162 is provided in association with cylinder block 142 and, by appropriate adjustment of each of the three assemblies, depending upon the size relationships between the hydraulic cylinders of the three cylinder blocks, precise tracking of the cylinder blocks can be accomplished. It should be understood that variation in location and arrangements of the cams and compensating cylinders can be made, depending upon size and space requirements and convenience of use. For example, all three cams and associated compensating cylinders can be incorporated in one of the three drive units, with appropriate hydraulic connections as needed.

Figure 12:
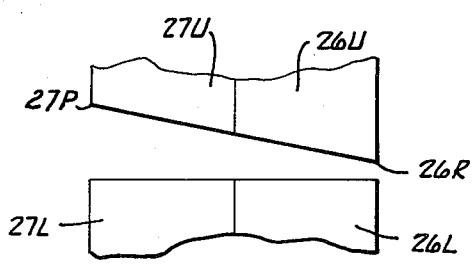
FIG. 12 is a schematic view of the lower edges of the upper shear blades, the view being taken in the direction of the arrows 12—12 in FIG. 2 and showing the rake on the blades.

Referring now to FIG. 12, there is illustrated schematically a significant feature of the present invention. As indicated in FIG. 2, the direction in which the shear is viewed to produce FIG. 12, is along a line bisecting the 90 degree angle between the blades of the shear. Although it will be observed that the upper edges of the lower shears 26L and 27L are co-planar, the lower edges of the upper shear blades have an upward rake, which is continuous from the right-hand end corner 26R to the intersection of the blades and then to the left-hand end corner 27P of the blade 27U. This makes it possible to shear along the lower edge of the blade 26U throughout its length (56 inches, for example) without engagement of the blade 27U with the stock. Then, if desired, the stock can be shifted along the length of the blade 26U, followed by another closure, so that by this nibbling approach, cutting only along the X axis, a cut longer than the length of the blade 26U can be achieved, before a cross cut by blades 27U and 27L is performed.

Figure 13:
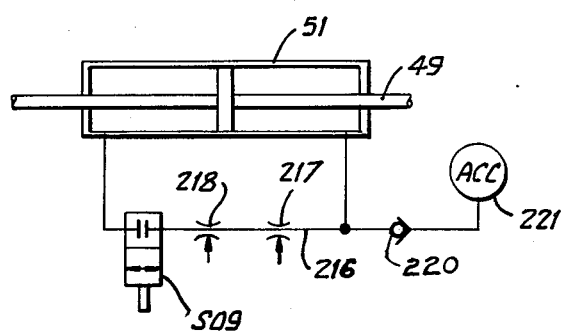
FIG. 13 is a schematic diagram of the hydraulic stroke control.

Referring now to FIG. 13, the ram stroke control cylinder 51 is shown with the piston thereof dividing it into two chambers. A hydraulic path between the two chambers is provided by means of the line 216 having a pair of adjustable orifices 217 and 218 therein, and a normally closed solenoid valve SO9 therein. An accumulator 221 is associated with the line to maintain a complete fill of hydraulic fluid at all times under pressure. It should be understood that the adjustable orifices are such that one of them is useful to restrict flow in one direction, and the other is useful to restrict flow in the other direction. In this manner, the force required to move the piston in one direction can be different from that required in the other direction. The solenoid valve SO9 provides means for easy and accurate control of the ram. When it is closed as it normally is, the ram is locked, so that it can move neither up nor down from the position in which it is disposed when the valve SO9 is closed. Check valve 220 prevents flow from the cylinder into the accumulator.

Figure 14:
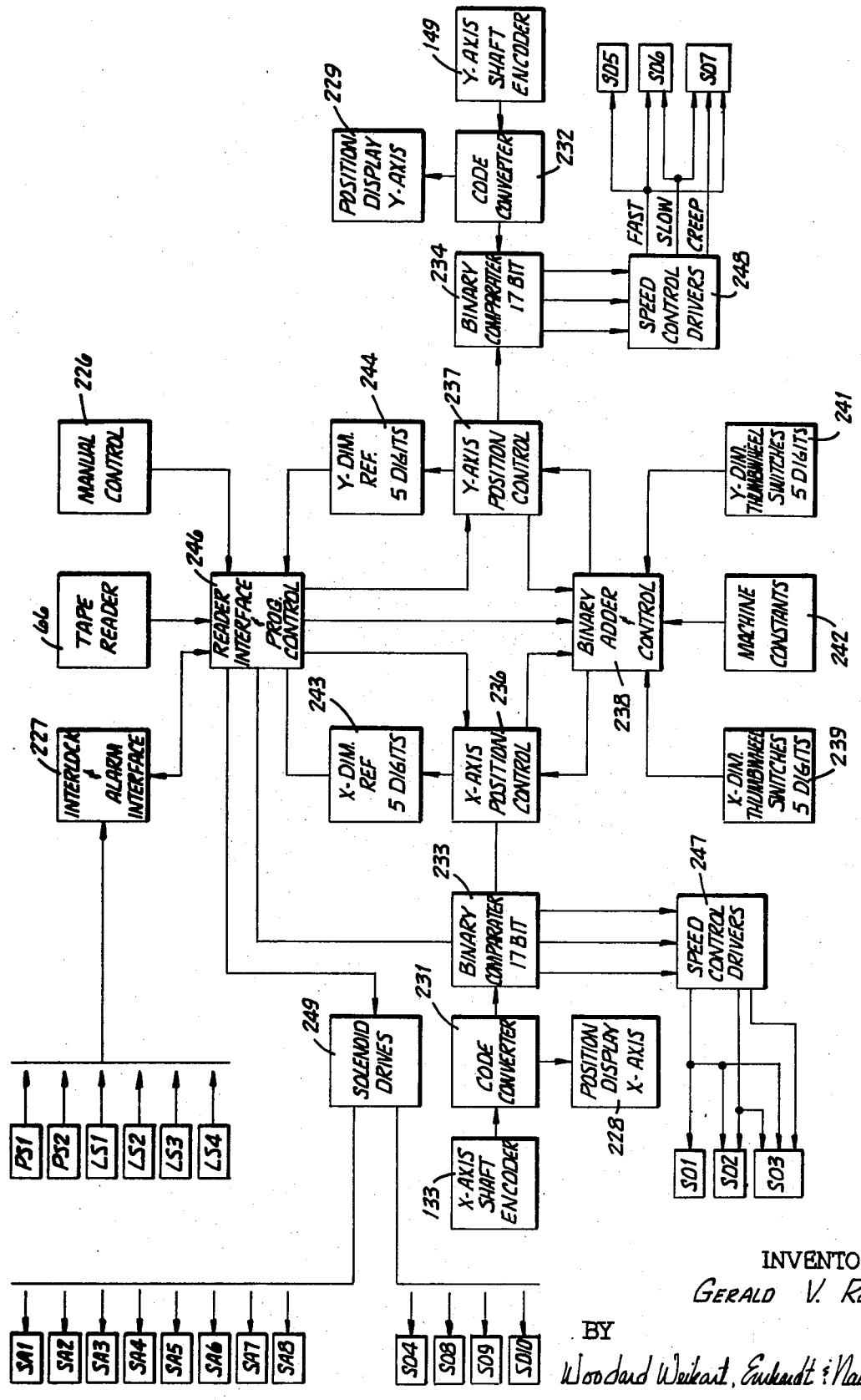
FIG. 14 is a block diagram of the operating system.

Referring now to FIG. 14, there is shown a general block diagram of the control apparatus. It includes the tape reader 66, the manual control block 226, and the interlock and alarm block 227. In addition, there are the X-axis rotary encoder 133, and the Y-axis rotary encoder 149. Manually operated, mode determining switches for the controller and shear are provided in the block 226. Situation indication signals are provided to the controller by the pressure switches and limit switches through the interlock and alarm block 227.

The X axis position display is at 228 and the Y axis position display is at 229, "Nixie" tubes or other indicator means being provided for this purpose. Code converters are provided at 231 and 232 for the inputs from the rotary encoders and provide outputs respectively to the binary comparators 233 and 234 which may have 17 bit capacity each. Other inputs to the binary comparators are derived from the X axis and Y axis position control blocks 236 and 237, respectively, which have inputs from the binary adder and control block 238, the inputs of which are derived from the part size X axis dimension thumb-wheel switches in block 239 and the part size Y axis dimension thumbwheel switches in block 241, both of which typically have a capacity for five decimal digits. Another input from the machine constants block 242 is also provided. The reference dimension for the X axis is provided by thumbwheel switches in block 243, and the reference dimension for the Y axis is provided by thumbwheel switches in block 244 coupled respectively to the X and Y axis position controls 236 and 237. The binary comparators provide outputs to the speed control drivers in block 247 and 248 for the X axis and Y axis carriage drive speed control valve solenoids, respectively. The drives from the controller 246 to the other valve solenoids are represented in block 249.

OPERATION

A. Operation in the Automatic Mode

The program tape 67 is loaded into the reader 66. The selector switch 252 is placed in the "Auto" position. The shear mode selector switch 253 for the shear is placed in the "Auto" position. The reset button 254 is pushed. The manual multiple cut switch 256 is turned "off".

The stock to be sheared is manually placed within the jaws of the grippers and, before the grippers are closed, the stock is manually pulled against the lowered end-locator gauge 251. Clamp button 71 is pressed to energize solenoid valve SA5 to cause inflation of the pneumatic tube 116, whereupon the grippers clamp the stock and pressure switch PS1 is closed. The end-locator gauge is then raised to space it from the end of the stock, and operate limit switch LS1.

Then the cycle start button 257 is pushed, whereupon the "Nixie" tube sets 258 and 259 display the position of the carriage in the X axis and Y axis directions, respectively. The tape reader advances the tape to the information block containing the data for the first cut, and reads it. The carriages fully retract. Then the controller calculates the direction of carriage motion and the initial carriage speed needed, based on the distance to be moved. This causes activation of the appropriate direction control solenoid drivers in block 249 (FIG. 14) and the appropriate speed control solenoid drivers in blocks 247 and 248 (FIG. 14). The carriages are thereby moved toward the coordinates dictated by the program tape. The rotary encoders feed to the comparators the travel information and, as the desired point is approached, the comparator outputs will begin the speed control sequenc to slow, creep and halt travel. Speed constants for valve selection may be predetermined by programmable circuit boards with, for example, four digits for fast speed, three digits for slow speed, and two digits for creep.

Once the carriages are properly positioned, the control activates a driver in block 249 for air solenoid valve SA6 to inflate the holddown tube 92 and clamp the sheet at the shears. Inflation of the holddown tube 92 will close pressure switch PS2, activating air solenoid valve SA7 to inflate the ram bellows 83, and activating oil solenoid valve SO9 in the hydraulic stroke control circuit, whereupon the ram is driven downward.

Descent of the ram will close limit switch LS4 at half stroke, and will close limit switch LS3 at full stroke. Closure of one or the other of these switches, depending upon the mode dictated by the tape, will de-energize air solenoid valve SA7, whereupon the ram bellows will be vented and the springs will retract the ram. When the ram reaches the top of the return stroke, it closes limit switch LS2, causing de-energization of the oil solenoid valve SO9 to lock-up the stroke control, and de-energization of the air solenoid valve SA6 to release the holddowns.

The closure of pressure switch PS2, or some other event associated with actuation of the ram can be used to restart to program tape and move it to the next data block for reading data for the next cut by the shears. The sequence of events will be repeated for each cut to be made, and will terminate upon reading an end of program character on the tape. A visual display designating the block of data being read, can be provided.

B. Operation In the Manual Multiple Cut Mode

In this mode, multiple parts of the same size are cut automatically, following initial manual establishment of dimensions. The controller mode switch 252 is placed in the "manual" position. The "manual multiple cut" switch 256 is turned "on". The shear mode switch 253 is turned to manual. Six thumbwheel switches in the X group 243 and five thumbwheel switches in the Y group 244 are used to dial in reference decimal dimensions corresponding to the size of the sheet stock to be used. Two sets of thumbwheel switches 263 and 264 are used to dial in the number of cuts (up to a maximum of 99) to be made on the X and Y axes, respectively. Switch 266 is moved to the "X first" or "Y first" position, depending upon whether the cuts are to be made on the X axis first or on the Y axes first. The five part size thumbwheel switches in the X group 239 and the five in the Y group 241 are positioned to define the size of the parts to be cut. Then the cycle start button 257 is pressed.

The first cut will produce the part nearest the reference corner on the stock (farthest from end gauge 251). The next cut will be made with movement occurring only on the X axis or Y axis, depending on the position of the switch 266. After cuts are made on the first designated axis according to the number established by switches 263 or 264, the carriages will retract to the reference corner, advance one part size increment on the other axis, and begin the next succession of cuts on the first axis. This process continues until all parts designated by the "number-of-cut" switches 263 and 264 have been cut.

The program tape may be eight lever 1 inch tape punches with EIA RS-244-A code. It will contain a "start of program" character to clear the block counter and prepare the controller for receipt of information. The next character will be a "start of information block" which is followed by 12 information characters, followed by an "end of block" character. An example of the significance of character in a block is as follows:

| Character | Data Unit |
| --- | --- |
| First | Start of Block |
| Second | Auxiliary Function |
| Third | X—Hundreds |
| Fourth | X—Tens |
| Fifth | X—Units |
| Sixth | X—Tenths (1/10) |
| Seventh | X—Hundredths (1/100) |
| Eighth | X—Thousandths (1/1000) |
| Ninth | Y—Tens |
| Tenth | Y—Units |
| Eleventh | Y—Tenths (1/10) |
| Twelfth | Y—Hundredths (1/100) |
| Thirteenth | Y—Thousandths (1/1000) |
| Fourteenth | End of Block |

Any characters inserted between blocks of information i.e. between end of block and start of block will not be recognized. Therefore information such as block number may be inserted between blocks. Any delete characters that appear in the block information will be ignored and not counted as part of the information. Therefore if any error is made in preparing the tape only the errored character need be changed to a delete character. The entire tape or block of information need not be destroyed.

Figure 15:
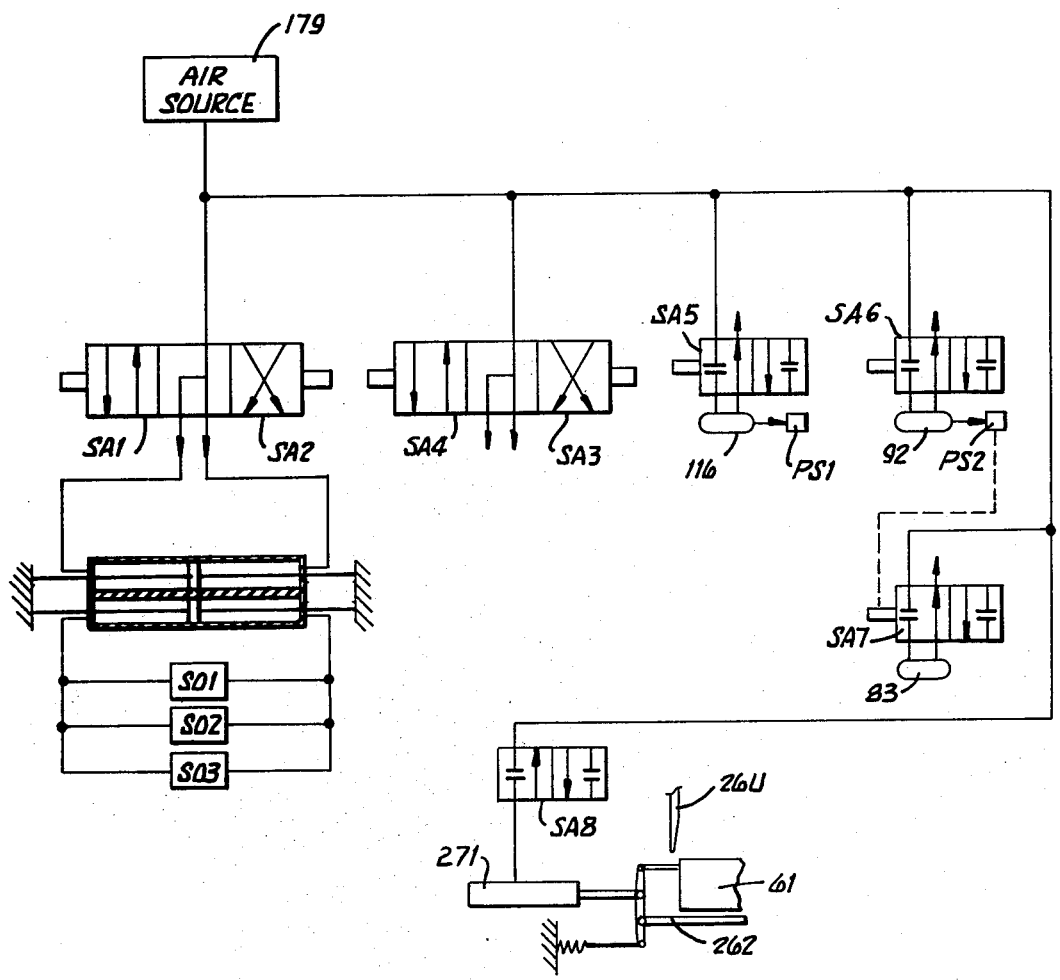
FIG. 15 is a schematic diagram of various actuators and valves for them.

The auxiliary function character may be used to cause any one of the following functions to take place:
 a. full cut—causes the shear to make a full stroke, cutting on both the X axis and Y axis, and closing limit switch LS3.
 b. half cut—caused the shear to make a stroke only to its mid-position as terminated by closure of limit switch LS4, to cut only on the X axis for a slitting ("nibbling") effect.
 c. gripper shift start—causes the carriages to move to the position specified in the data block, whereupon the hold-downs clamp the part and the grippers release. The shear does not function. The completion of the gripper shift function can be accomplished in the next information block.
 d. gripper shift finish—causes the carriages to move to the location where the grippers are to regrip the stock, and the hold-downs then unclamp. The shear does not function.
 e. scrap—energizes solenoid SA8 to move conveyor 61 aside and open the scrap door 262 (FIG. 15) as the shearing is done.

Obviously there are limit switches and interlocks, error signals and alarms as desired to prevent damage and for the safety of the operator, but a large variety of choices and possibilities exist in this area and need not be described here.

A trim function can be provided. For this purpose a trim switch 261 is turned "on". In the following description, it should be understood to be an example where the X axis shear is 56 inches long, and the Y axis shear is 50 inches long. If the trim function is turned on, the first movement of the machine will be to a position so that the stock sheet of metal can be trimmed to the dimensions given by the reference thumbwheels. It may be necessary to trim in more than one stroke along each axis. This will automatically be determined by the reference dimensions dialed into the thumbwheels. Any X dimension greater than 52 inches but less than 105 inches, will require two cuts along the X axis for trimming. The first cut will be made at X equals 48 inches and Y equals reference and the second cut will be made at a point past X equals zero, Y equals reference. In the case of the X dimension being greater than 105 inches, the X trim must take place in three strokes. The first cut will occur at X equals 96 inches, Y equals reference and the second cut will occur at X equals 48 inches, Y equals reference. The final X trim cut would occur at X equals zero, Y equals reference.

For any Y dimension greater than 49 inches, trim must occur in two cuts. The first cut would occur at X equals reference, Y equals 48 inches The second cut will occur at X equals reference, Y equals 0.750 inches. No more than two cuts for Y trim are permissible. All cuts during trim are full strokes. If the trim cut is turned off the shearing will occur as described above. The scrap slot will be automatically opened during trimming. After trimming the machine will move to the first cut to be made which will be that piece nearest the reference corner.

The above described trim function implemented by moving the "trim switch" 261 to "on" position, is available only in the manual multiple cut mode. Any trimming operations needed in the automatic mode must be provided by suitable instructions on the tape. Appropriate interlocks may be provided to disable the manual trim function in the automatic mode.

Figure 16:
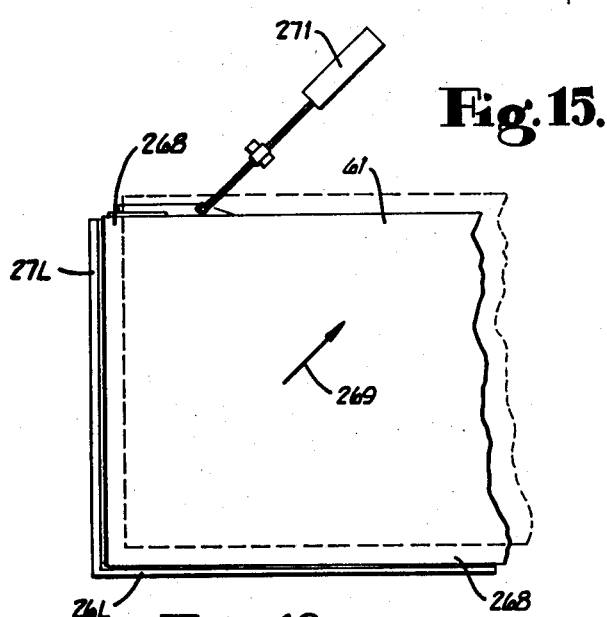
FIG. 16 is a schematic plan view of the conveyor shift, and scrap slot arrangement.

Referring to FIG. 16, the scrap slot is an L-shaped slot 268 immediately behind the blades 26L and 27L and produced by moving the conveyor assembly 61 in the direction of arrow 269 from the position in solid outline to the position in dotted outline so that there is an L-shaped space between a vertical projection of the blades and a vertical projection of the margins of said conveyor belt as indicated at 268 in FIG. 16. Air cylinder 271, when activated, by solenoid valve SA8, serves this purpose. In this manner trim strips may fall through the slot and be directed by a door 262 or other means into a bin or scrap conveyor. As an alternative, the door may be deleted altogether.

A "shear jog" pushbutton 267 is provided. When the shear mode selector switch 253 is in the "off" or "manual" position the controller is disabled from affecting shear operation. Pushing the jog button opens the solenoid SO9 as long as the button is depressed, so that the ram descends if air solenoid SA7 is energized. This solenoid SA7 normally is energized when the shear mode switch is in "manual" position.

The invention claimed is:
1. A shearing machine comprising:
 base means;
 first and second pairs of power driven shears mounted on said base means, a cutting edge of said first pair being disposed in a first plane and a cutting edge of said second pair being disposed in a second plane intersecting said first plane, said cutting edges meeting at a corner;
 and power driven material positioning means mounted on said base means and associated with said shears, and including material edge margin gripper means for gripping a piece to be sheared, and including drive means coupled to said gripper means to drive said gripper means, and thereby said piece, to various positions with respect to edges of shears of said first and second pair, to locate said piece for shearing by at least one of said pairs of shears at a location on the piece determined by the positioning of said gripper means prior to operation of said shears.

2. The machine of claim 1 and further comprising:

a ram on said base means and supporting one shear of each of said pairs;

a frame on said base means and supporting the other shear of each of said pairs;

inflatable and deflatable pneumatic bag means disposed between said ram and said frame for driving said ram supported shears into shearing cooperation with said frame supported shears.

3. The machine of claim 1 and further comprising;

ram means on said base means and supporting one shear of each of said pairs;

frame means on said base means and supporting the other shear of each of said pairs;

said material positioning means including carriage means mounted on said frame means, said edge margin gripper means being mounted on said carriage means.

4. The machine of claim 3 wherein said carriage means include first and second carriages, said first carriage being mounted to said frame for movement thereon in a Y axis direction toward said shears, and said second carriage being mounted to said first carriage for movement thereon in an X axis direction perpendicular to said Y axis direction, said gripper means being mounted on said second carriage.

5. The machine of claim 4 wherein said drive means include:

a source of pneumatic pressure:

first pneumatic cylinder means having piston rods thereof affixed to said frame means, and selector valve means coupled to said source and to said first cylinder means and operable to pressurize chambers in said cylinder means alternately on opposite sides of a piston therein, to drive said first cylinder means in opposite directions, and means coupling said first carriage to said first cylinder means.

7. The machine of claim 5 wherein said drive means further include:

additional pneumatic cylinder means having piston rods thereof parallel to said piston rods of said first cylinder means and affixed to said frame means, said selector valve means being coupled to said additional cylinder means and operable to pressurize chambers in said additional cylinder means alternately on opposite sides of piston means therein, to drive said additional cylinder means along with said first cylinder means, and coupling said first carriage to said additional cylinder means.

8. The machine of claim 7 and further comprising:

hydraulic cylinders, one of said cylinders being affixed to each of said pneumatic cylinder means, and hydraulic communication means between chambers of said cylinders to accommodate shuttling of hydraulic fluid between chambers of different ones of said cylinders as said cylinder means are driven by pneumatic pressure, said communication means and cylinders being filled with hydraulic fluid to assure positive simultaneous tracking of said cylinder means with each other.

9. The machine of claim 8 and further comprising:

hydraulic cylinder bore difference compensating means including a storage member associated with said communication means, and a cam member and a follower associated with said cam member and said storage member, one of said members being fixed with respect to said frame means, and the other of said members being fixed with respect to one of said cylinders, said compensating means being adjustable to cause said cam and follower member to displace fluid from said storage member as said follower is operated by said cam member upon movement of said one cylinder.

10. The combination of claim 8 and further comprising:

valve means in said hydraulic communication means and normally precluding the shuttling of oil between said chambers of at least two of said hydraulic cylinders, and operable, when actuated, to permit said shuttling of oil and movement of said first carriage in a direction as determined by said selector valve means.

11. The machine of claim 8 wherein said drive means further include:

further pneumatic cylinder means having piston rods affixed to said first carriage;

means coupling said second carriage to said further pneumatic cylinder means;

and second selector valve means coupled to said source and to said further pneumatic cylinder means and operable to pressurize chambers in said further pneumatic cylinder means alternately on opposite sides of a piston therein, to drive said further pneumatic cylinder means, and thereby said gripper means, in opposite directions.

12. The machine of claim 11 and further comprising:

a further hydraulic cylinder affixed to said further pneumatic cylinder means, divided into two chambers by a piston therein;

and further valve means in a conduit between said two chambers and normally closed preventing shuttling of oil between said two chambers to lock up said second carriage with respect to said first carriage, said further valve means being operable, when actuated, to permit communication between said two chambers accommodating drive of said second carriage with respect to said first carriage in a direction designated by said second selector valve means.

13. The machine of claim 4 wherein said drive means include:

first and second cylinders in fixed relation to each other and having, respectively, first and second piston rods therein affixed to said first carriage;

a pair of pistons, one of said pistons being disposed in each of said cylinders and connected to the respective piston rod therefor;

a first source of pressurized fluid;

first multi-condition valve means having a first condition providing a balance of force on both sides of the piston in said first cylinder, said valve means having a second condition coupling said source to a chamber at one side of the piston in said first cylinder and discharging the chamber at the opposite side of the piston in said first cylinder to drive said first cylinder in one direction, and said valve means having a third condition coupling said source to said chamber at the opposite side and discharging said chamber at the said one side to drive said first cylinder in the opposite direction;

first passageway means coupled between a first chamber of said second cylinder and a second chamber of said second cylinder;

liquid filling said chambers of said second cylinder and said first passageway means;

second valve means in said first passageway means and normally precluding shuttling of liquid in said first passageway means, said second valve means being operable, when actuated, to permit shuttling of liquid between said first and said second chambers of said second cylinder whereby motion of said cylinders in response to pressure from said source as directed by said first valve means in said second and third condition thereof is controlled by said second valve means, said second carriage being coupled to said first cylinder to be driven thereby on said first carriage.

14. The machine of claim 13 wherein said second valve means includes:

first and second separately operable valves in parallel passageway paths and operable simultaneously and in sequence to provide different transfer rates and thereby different speeds of motion of said second carriage.

15. The machine of claim 3 wherein:

said carriage means include first and second carriages, said first carriage being mounted to said frame for movement thereon back and forth in one direction, and said second carriage being mounted to said first carriage for movement back and forth with respect to said first carriage;

said shears include lower blades, each having an upper edge;

table means are included having top surface means substantially co-planar with said upper edges;

said first carriage being disposed substantially entirely below the level of said top surface means; and said second carriage being disposed substantially entirely below the level of said top surface means.

16. The machine of claim 15 wherein said table means include:

a plurality of slats disposed parallel to said first plane of said cutting edge of said first pair of shears;

means normally holding said slats with the top surfaces thereof substantially co-planar with said upper edges, said holding means being responsive to movement of said first carriage toward said first cutting edge to permit descent of said slats progressively to clear said second carriage passing thereover.

17. The machine of claim 16 wherein:

said slats are pivotally connected and have support rollers at one end thereof;

said holding means include a generally S-shaped track disposed at one end of said slats and receiving said rollers, said track being secured to said first carriage and movable therewith.

18. The machine of claim 16 wherein:

said slats are pivotally connected and have support rollers at one end thereof;

said holding means include a plurality of support plates individually supported by a stationary portion of said table means, and said holding means further include a track secured to said first carriage, said rollers being normally supported on said plates;

said first carriage including a cam engageable with said plates for displacing said plates from supporting position under said rollers and substituting said track as the support for said rollers successively, as said first carriage moves toward said first cutting edge.

19. The machine of claim 3 wherein said drive means include:

first and second cylinders affixed together and having, respectively, first and second piston rods therein and affixed to said frame means;

third and fourth cylinders affixed together and having, respectively, third and fourth piston rods therein affixed to said frame means;

a plurality of pistons, one of said pistons being disposed in each of said cylinders and connected to the respective piston rod therefor;

a first source of pressurized fluid;

first multi-condition valve means having a first condition providing a balance of force on both sides of the pistons in said first and third cylinders, said valve means having a second condition coupling said source to chambers at one side of the pistons in said first and third cylinders and discharging chambers at the opposite side of pistons in said first and third cylinders to drive said first and third cylinders in one direction, and said valve means having a third condition coupling said source to said chambers at the opposite sides and discharging said chambers at the said one side, to drive said first and third cylinders in the opposite direction;

first passageway means coupled between a first chamber of said second cylinder and a second chamber of said fourth cylinder, and second passageway means coupled between a second chamber of said second cylinder and a first chamber of said fourth cylinder;

liquid filling said chambers of said second and fourth cylinders and said first and second passageway means;

second valve means in said first passageway means and normally precluding the shuttling of liquid in said first passageway means, said second valve means being operable, when actuated, to permit shuttling of liquid in said first passageway means whereby motion of said third and fourth cylinders is synchronized with motion of said first and second cylinders caused by pressure from said source as directed by said first valve means in said second and third condition thereof, said carriage means being coupled to said cylinders for movement by said cylinders.

20. The machine of claim 19 and further comprising:
a source of liquid stored under pressure and coupled to said passageway means through unidirectional valve means to supply make-up liquid to said passageway means.

21. The system of claim 20 wherein:
said source is an accumulator.

22. The system of claim 19 and further comprising:
third valve means operable, when actuated, to provide communication between said first and second passageway means.

23. The system of claim 19 and further comprising:
first compensating liquid storage chamber means having a movable wall, and filled with liquid, and coupled to said second passageway means;
and first cam means coupled to said second cylinder and operable on said wall in response to movement of said second cylinder to receive liquid into said storage chamber means from said second passageway means.

24. The system of claim 23 wherein:
said cam means include a ramp connected to said second cylinder, and a follower on said ramp and connected to said movable wall,
the shape of said ramp with reference to said second cylinder, and the size of said wall being such that the volume of liquid received in said first storage chamber means as said second cylinder moves equals a difference in volume change between said second chamber of said second cylinder and said first chamber of said fourth cylinder as said second cylinder moves.

25. The system of claim 24 and further comprising:
second compensating liquid storage chamber means having a movable wall, and filled with liquid, and coupled to said first passageway means;
second cam means including a second ramp connected to said fourth cylinder, and a follower on said second ramp and connected to the movable wall of said second storage chamber means,
the shape of said second ramp with reference to said fourth cylinder, and the size of said wall of said second storage chamber means being such that a volume of liquid is discharged from said second storage chamber means into said first passageway means as said fourth cylinder moves, said discharged volume equalling a difference in volume change between said first chamber of said second cylinder and said second chamber of said fourth cylinder as said fourth cylinder moves.

26. The machine of claim 1 wherein:
said first and second planes are substantially perpendicular to a third plane,
said cutting edge of said first pair having a rake extending from a first point near one end thereof to a second point near the opposite end thereof, and said cutting edge of said second pair having a rake extending from a third point near one end thereof to a fourth point near the opposite end thereof, said first, second, and fourth points being disposed at increasingly greater distances from said third plane.

27. The combination of claim 26 wherein:
said second and third points are coincident, and lie in the intersection of said first and second planes.

28. The combination of claim 26 and further comprising:
ram means on said base means and supporting said cutting edges;
and ram drive means on said base means and coupled to said ram means for driving said cutting edges;
limit means on said ram means and coupled to said ram drive means to limit the stroke of said ram means whereby;
said ram means are drivable through a partial stroke to engage only said cutting edge of said first pair with said piece to be sheared, for shearing only with said cutting edge of said first pair.

29. The machine of claim 1 and further comprising:
material hold-down means on said base means and associated with said shears;
said hold-down means having actuator means energized to grip said piece during shearing,
said actuator means being energizable for holding down said piece during release of said gripper means;
said drive means being operable during release of said gripper means and actuation of said hold-down actuator means for shifting said gripper means on said piece for regripping of said piece at another location on said piece.

30. The machine of claim 1 and further comprising:
ram means on said base means and supporting one shear of each of said pairs; and
frame means on said base means and supporting the other shear of each of said pairs,
said ram means being pivotally connected to said frame means for movement of the shears mounted on said ram means up and down as said ram means pivots in opposite directions on said frame means.

31. The machine of claim 30 wherein:
the shears supported on said ram means are affixed thereto and have cutting edges meeting in a corner; and
the shears supported on said frame means are affixed thereto and have cutting edges meeting in a corner.

32. The machine of claim 31 wherein:
said shears supported on said ram means are immediately within the corner defined by the cutting edges of the shears supported on said frame means; and
said gripper means are outside the corner defined by edges of the shears supported on said frame means.

33. The machine of claim 1 wherein:
said first and second planes are perpendicular to each other and the corner meeting of said edges is at the intersection of said planes; and
said gripper means are located outside said corner.

34. The machine of claim 33 wherein said gripper means are located in front of said shears.

35. A shearing machine comprising:
a pair of shears;
material positioning means associated with said shears and including gripper means to grip a piece to be sheared and drive means to drive said piece toward said shears;
a plurality of slats disposed parallel to said shears;

means normally holding said slats with the top surfaces thereof in a feeding plane for material being fed into said shears;

the said holding means being responsive to movement of a portion of said drive means toward said shears to permit descent of said slats progressively to clear said gripper means passing thereover.

36. The combination of claim 35 wherein:

said slats are pivotally connected together and have support rollers at one end thereof;

said holding means including a generally S-shaped track disposed at one end of said slats and receiving said rollers, said track being secured to said portion of said drive means and movable therewith.

37. The combination of claim 35 wherein:

said slats are pivotally connected together and have support rollers at one end thereof;

said holding means including a plurality of support plates individually supported at a substantially constant elevation, said holding means further including a track secured to said portion of said drive means, said rollers being normally supported on said plates;

said drive means portion including a cam engagable with said plates for displacing said plates from supporting position under said rollers and substituting said track as support for said rollers successively as said drive means portion moves toward said shears.

38. A shearing machine comprising:

a pair of shears;

material positioning means associated with said shears and including gripper means to grip a piece to be sheared and drive means to drive said sheet toward said shears, said positioning means further including first and second carriages, said first carriage being mounted for movement back and forth toward said shears, and said second carriage being mounted to said first carriage for movement back and forth with respect to said first carriage;

stock support table means having a top surface means at an elevation providing a stock feed line into said shears, said first carriage being disposed substantially entirely below the level of said top surface means; and said second carriage being disposed substantially entirely below the level of said top surface means.

6. The machine of claim 5 wherein said coupling means include:

a bi-directional belt and pulley combination connecting said first carriage to said first cylinder means.

* * * * *